United States Patent [19]
Harben, Jr.

[11] 3,714,682
[45] Feb. 6, 1973

[54] METHOD AND APPARATUS FOR REMOVING OIL GLANDS FROM FOWL

[75] Inventor: Grover S. Harben, Jr., Gainesville, Ga.

[73] Assignee: Gainesville Machine Company, Inc., Gainesville, Ga.

[22] Filed: Feb. 16, 1971

[21] Appl. No.: 115,318

[52] U.S. Cl. ........................................... 17/11, 17/52
[51] Int. Cl. ............................................... A22c 21/00
[58] Field of Search .................... 17/11, 12, 45, 52

[56] References Cited

UNITED STATES PATENTS

| 3,417,424 | 12/1968 | Chamberlain | 17/11 |
| 3,038,197 | 6/1962 | Turner | 17/11 |
| 3,191,221 | 6/1965 | Kesler et al. | 17/11 |
| 3,213,488 | 10/1965 | Volpe | 17/11 |
| 3,477,092 | 11/1969 | Simmons | 17/11 |

*Primary Examiner*—Lucie H. Laudenslager
*Attorney*—Newton, Hopkins & Ormsby

[57] ABSTRACT

A bird is moved along a path and feed means including a pair of counterrotating rollers grips the opposite sides of the tail of the bird and moves the tail laterally of said path into engagement with the cutting edge of a fixed cutting means extending between said rollers. One of the rollers slopes upwardly toward the cutting means so as to pinch the oil gland of the bird between the cutting edge of the cutting means and said upwardly sloping member to cut off the oil Gland. Guide means is provided for preventing portions of the bird other than the tail from being carried laterally by the feed means.

9 Claims, 4 Drawing Figures

INVENTOR
GROVER S. HARBEN, JR.
BY: Newton, Hopkins, + Ormsby
ATTORNEYS

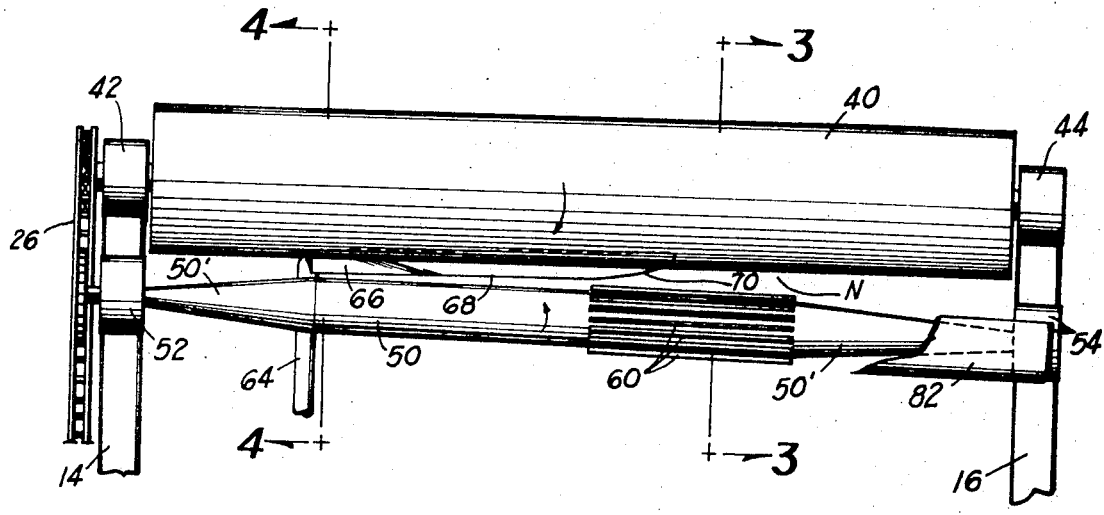
FIG 2
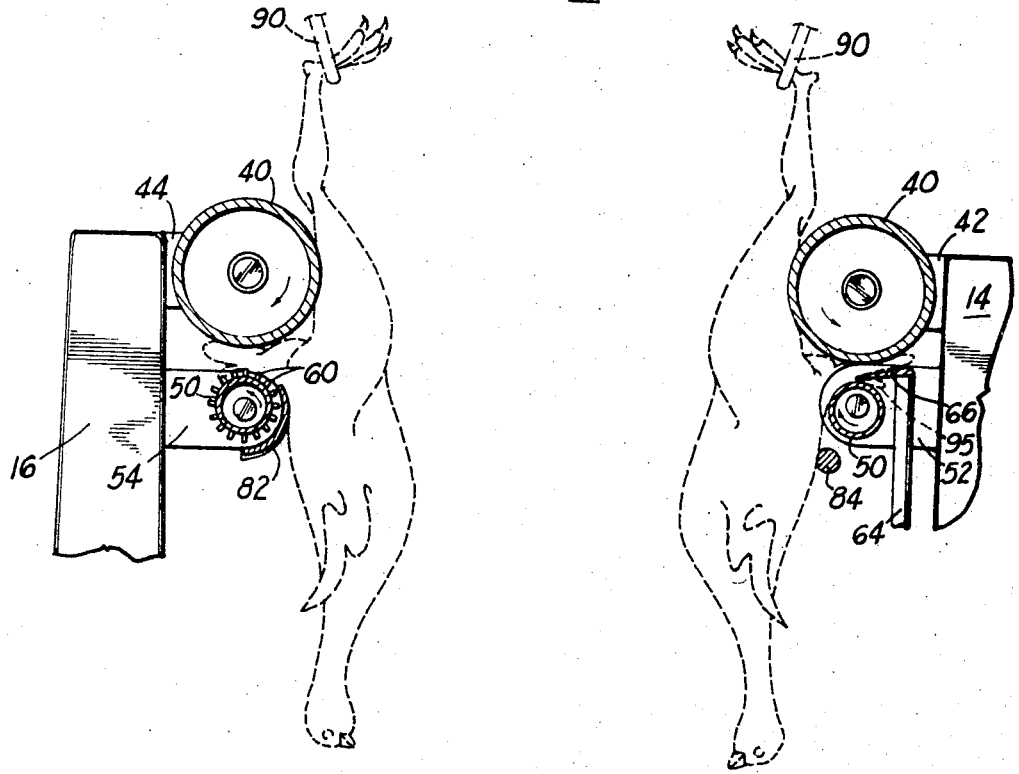
FIG 3
FIG 4

METHOD AND APPARATUS FOR REMOVING OIL GLANDS FROM FOWL

BACKGROUND OF THE INVENTION

The present invention relates to a method and apparatus for removing oil glands from fowl and, in particular, to removing an oil gland from a chicken. Chickens have a small upwardly projecting oil gland on the top of their tails. The birds take their beak and obtain oil from this oil gland which they use to oil their feathers.

When processing chickens, after the feathers have been removed from the chicken, this oil gland is cut off. In the past, the oil gland has been manually removed which is a time consuming operation. Accordingly, it is desirable to provide apparatus for automatically removing such oil glands in a conveyor-line type processing procedure.

SUMMARY OF THE INVENTION

The present invention includes feed means for engaging the tail of a bird moving along a path and moving the tail laterally into engagement with the cutting edge of a fixed cutting means. The feed means comprises a pair of counterrotating rollers. One of these rollers has a longitudinal axis which is oblique to the other and this one roller extends upwardly toward the cutting means so as to pinch the oil gland between the cutting edge of the cutting means and the upwardly sloping roller to cut off the oil gland. This one roller also includes ribs on the outer surface thereof to insure good frictional contact with the tail of the bird.

The cutting means is disposed in fixed position between the two rollers. The cutting means is relatively thin and is disposed in generally parallel relationship with the longitudinal axis of the upper roller.

Guide means includes a shield extending from one side of the apparatus to an intermediate point and a deflector extending from such intermediate point to the opposite side of the apparatus. This guide means prevents portions of the bird other than the tail from being carried laterally by the feed means.

The apparatus of the present invention is adapted to operate in a completely automatic manner thereby eliminating the necessity of performing any manual operations in the removal of the oil gland from chickens and the like.

BRIEF DESCRIPTION OF THE DRAWINGS

FIG. 2 is a front elevation of a portion of the structure shown in FIG. 1 with certain parts removed for clarity of illustration;

FIG. 3 is a sectional view taken substantially along line 3—3 of FIG. 2 looking in the direction of the arrows; and FIG. 4 is a sectional view taken substantially along line 4—4 of FIG. 2 looking in the direction of the arrows.

DESCRIPTION OF THE PREFERRED EMBODIMENT

Figure 1:
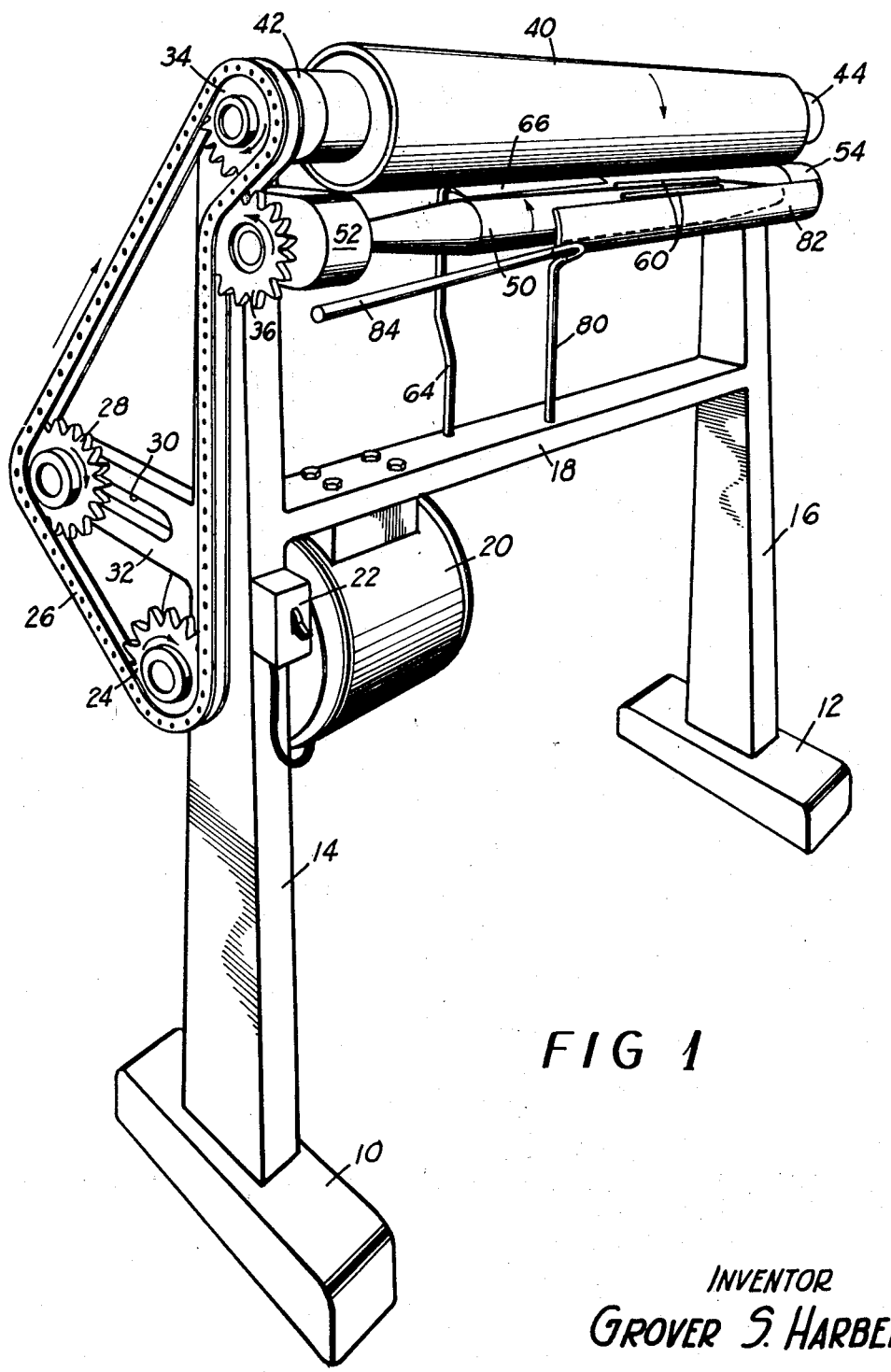
FIG. 1 is a top perspective view of the overall apparatus of the present invention.

Referring now to the drawings wherein like reference characters designate corresponding parts throughout the several views, the apparatus as seen in FIG. 1 includes a pair of base members 10 and 12 connected with a pair of generally parallel vertically extending support members 14 and 16 respectively. A cross member 18 is connected between support members 14 and 16 and supports a drive means 20 in the form of an electric motor, the operation of which is controlled by a manually operated switch 22.

The output shaft of motor 20 is connected with a drive sprocket 24. A chain 26 extends around drive sprocket 24 and an idler sprocket 28. Sprocket 28 is adjustably supported within an elongated slot 30 provided in a horizontally disposed rearwardly extending support member 32 connected with support member 14 previously described. Adjustment of the position of the drive sprocket within slot 30 is adapted take up slack in drive chain 26.

The drive chain extends around driven sprockets 34 and 36 which are driven in the directions indicated by the arrows on FIG. 1. Driven sprocket 34 is drivingly connected with a first roller 40 supported for rotation between a pair of bearing portions 42 and 44 mounted on the vertical supports 14 and 16 respectively. The driven sprocket 36 is drivingly connected with a roller 50 supported for rotation between a pair of bearing portions 52 and 54 mounted on vertical supports 14 and 16 respectively.

The counterrotating rollers 40 and 50 comprise a feed means, the operation of which is more fully set forth hereinafter. It will be noted, as seen in FIG. 2, that the longitudinal axis of roller 50 is oblique to the longitudinal axis of roller 40 which is disposed generally horizontally. The two rollers define a converging nip indicated by reference character N as seen in FIG. 2, which converges from right to left as seen in this figure. In other words, roller 50 slopes upwardly and to the left whereby the space between the counterrotating rollers is progressively smaller proceeding from right to left in this figure.

Roller 50 includes opposite tapered end portions 50', the central portion of the roller being of generally cylindrical configuration and having at one end thereof a plurality of radially outwardly extending projections 60 in the form of elongate longitudinally extending ribs. These ribs insure good frictional engagement with the tail of a bird as the bird passes this portion of the feed means.

A support member 64 extends upwardly from cross member 18 and serves to support in fixed position a cutting means 66 in the form of a thin cutting blade having a sharp cutting edge 68 extending longitudinally along the forward edge of the blade and terminating in a rearwardly curving leading edge 70. It will be noted that the leading edge of the blade is disposed in overlying relationship to the ribs 60 formed on roller 50.

As seen most clearly in FIG. 4, the cutting blade extends between the rollers and is disposed in overlying relationship to the lower roller 50. The blade is disposed in generally horizontal position so as to be substantially parallel with the longitudinal axis of roller 40. Roller 50 accordingly slopes upwardly toward the cutting blade.

A further support member 80 extends upwardly from cross member 18 and is rigidly connected with a shield member 82. This shield member 82, as seen in FIG. 3, is of generally arcuate cross sectional configuration and extends from the righthand side of the apparatus to an intermediate portion thereof. The shield member is disposed in spaced relationship to lower roller 50 and prevents the portion of the bird immediately below the tail thereof, as seen in FIG. 3, from coming into engagement with roller 50 and the ribs 60 formed thereon.

As seen in FIG. 1, support member 80 has formed at the upper end thereof an integral laterally extending portion 84 which extends from said intermediate point of the apparatus to a point adjacent the lefthand side of the apparatus. Portion 84 defines a deflector which diverges from the machine in a right to left direction and which serves to deflect the bird away from the feed rollers and the drive sprockets and drive chains at the lefthand side of the apparatus.

During operation of the apparatus, and according to the method of the present invention, the bird is moved along a path by a suitable conventional conveyor means including depending shackles 90 to which the feet of the bird are attached as seen in FIGS. 3 and 4. The conveyor means is positioned above the apparatus of the present invention so as to move the bird from right to left, as seen in FIGS. 1 and 2, so that the bird will be suspended under the influence of gravity in such a position that the tail of the bird is adapted to engage rollers 40 and 50.

As the bird moves from right to left, as seen in FIGS. 1 and 2, the upper and lower sides of the tail will be gripped between rollers 40 and 50, the ribs 60 on roller 50 insuring good frictional engagement with the side of the tail adjacent the oil gland 95. The counterrotating rollers 40 and 50 will feed the tail of the bird into the nip between the rollers thereby moving the tail to the left, as seen in FIG. 3, or to the right, as seen in FIG. 4.

As the bird continues to move longitudinally of the apparatus, the leading edge 70 of the blade will automatically move into a position beneath the tail of the bird and in overlying relationship to the oil gland thereof. Further movement of the bird longitudinally of the apparatus causes the oil gland to be pinched between the cutting edge of the cutting blade and the upwardly sloping bottom roller 50 until the position shown in FIG. 4 is reached at which the oil gland is completely severed from the tail of the bird. The tail will then pass out from between the top of the cutting blade and the under surface of roller 40 and will be released so that the bird can swing away from the feed means under the influence of deflector 84.

As the bird moves longitudinally along the length of the apparatus, shield 82 and deflector 84 prevent portions of the bird other than the tail from being carried between the feed rollers, and deflector 84 additionally causes the bird to move away from the feed rollers after the tail is released from between the cutting blade and the upper roller.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. Apparatus for removing oil glands from fowl comprising feed means for engaging the tail of a bird moving along a predetermined path to move the tail laterally of said path, said feed means comprising a pair of vertically spaced members defining a nip therebetween, fixed cutting means disposed adjacent said nip and having a cutting edge for engaging and cutting off an oil gland of the bird when the tail is moved laterally of said path by the feed means, said cutting means extending between said members in overlying relationship to the lower one of said members, and said members comprising a pair of rollers, at least one of which has a longitudinal axis oblique to the other of said rollers to define a conveying nip between said rollers.

2. Apparatus as defined in claim 1 wherein at least one of said rollers has outwardly extending projections thereon.

3. Apparatus as defined in claim 2 wherein said projections comprise a plurality of spaced elongate ribs extending longitudinally of said one roller.

4. Apparatus as defined in claim 3 wherein said ribs are disposed adjacent the leading edge of said cutting means.

5. Apparatus for removing oil glands from fowl comprising feed means for engaging the tail of a bird moving along a predetermined path to move the tail laterally of said path, and fixed cutting means having a cutting edge for engaging and cutting off an oil gland of the bird when the tail of the bird is moved laterally of said path by the feed means, said cutting means comprising a relatively thin knife-like cutting blade, said feed means including a pair of vertically spaced counter rotating rollers, and said blade extending between said rollers and being disposed substantially parallel with the axis of the upper one of said rollers.

6. Apparatus for removing oil glands from fowl comprising feed means for engaging the tail of a bird moving along a predetermined path to move the tail laterally of said path, fixed cutting means having a cutting edge for engaging and cutting off an oil gland of the bird when the tail of the bird is moved laterally of said path by the feed means and guide means for preventing portions of a bird other than the tail from being carried laterally of said path by the feed means, said guide means including a shield extending from one side of the apparatus to an intermediate point thereof.

7. Apparatus as defined in claim 6 wherein the guide means also includes a deflector extending from said intermediate point to the other side of the apparatus.

8. Apparatus for removing oil glands from fowl comprising feed means for engaging the tail of a bird moving along a predetermined path to move the tail laterally of said path, and fixed cutting means having a cutting edge for engaging and cutting off an oil gland of the bird when the tail is moved laterally of said path by the feed means, said apparatus including support means, and drive means supported at one side of the support means and being drivingly connected with said feed means comprising a pair of counter rotating rollers.

9. Apparatus for removing oil glands from fowl comprising feed means for engaging the tail of a bird moving along a predetermined path to move the tail laterally of said path, and fixed cutting means having a cutting edge for engaging and cutting off an oil gland of the bird when the tail of the bird is moved laterally of said path by the feed means, said feed means comprising a pair of vertically spaced members defining a nip therebetween and said cutting means being disposed adjacent said nip and extending between said members in overlying relationship to the lower one of said members.

* * * * *